No. 699,449. Patented May 6, 1902.

E. CHILDREN, Dec'd.
F. R. CHILDREN, Administrator.
CULTIVATOR.
(Application filed May 31, 1901.)

(No Model.)

Witnesses
L. G. Handy.
Carroll W. Kimball.

Inventor
Frank R. Children
Administrator Estate Edwin Children
By Clem. F. Kimball
Attorney

UNITED STATES PATENT OFFICE.

FRANK R. CHILDREN, OF COUNCIL BLUFFS, IOWA, ADMINISTRATOR OF EDWIN CHILDREN, DECEASED.

CULTIVATOR.

SPECIFICATION forming part of Letters Patent No. 699,449, dated May 6, 1902.

Application filed May 31, 1901. Serial No. 62,664. (No model.)

*To all whom it may concern:*

Be it known that EDWIN CHILDREN, now deceased, but late a citizen of the United States, and a resident of Council Bluffs, in the county of Pottawattamie, State of Iowa, did prior to his death invent certain new and useful Improvements in Cultivators; and I, FRANK R. CHILDREN, duly and legally appointed and qualified administrator of the estate of the deceased, hereby declare the following to be a full, clear, and exact description of the invention, such as will enable others skilled in the art to which it appertains to make and use the same.

This invention relates to an improvement in cultivators of the class employing a plurality of gangs and to that upon which inventor had heretofore obtained Letters Patent No. 626,857, dated June 13, 1899.

The objects of the invention are, first, to provide such a machine that the greatest possible height can be obtained over the plants without detriment to the cultivating properties of the machine; second, to provide a means for changing the draft in such a machine or shifting the hitch of the draft-power to the cultivator, thereby enabling the operator to hold the machine at will and better control and guide the same on sideling and hillside ground, over irregular rows and furrows, and in fields where there are no furrows to guide the machine, and for better control and guidance in entering furrows where such furrows are used in planting; third, to provide a machine requiring less space within which to turn at the end of the courses, but capable of cultivating all of the space between all of the rows without traversing any of the rows passed over and in so doing be capable of opening up small furrows upon the ridges of soil that lie between the rows of plants; fourth, to provide such a cultivator that the control of the gangs as to raising and lowering and lateral movement shall be more perfect and convenient. These objects are obtained by the construction set forth in the accompanying drawings, which illustrate and explain the same, but which are not intended as limitations.

Figure 1:
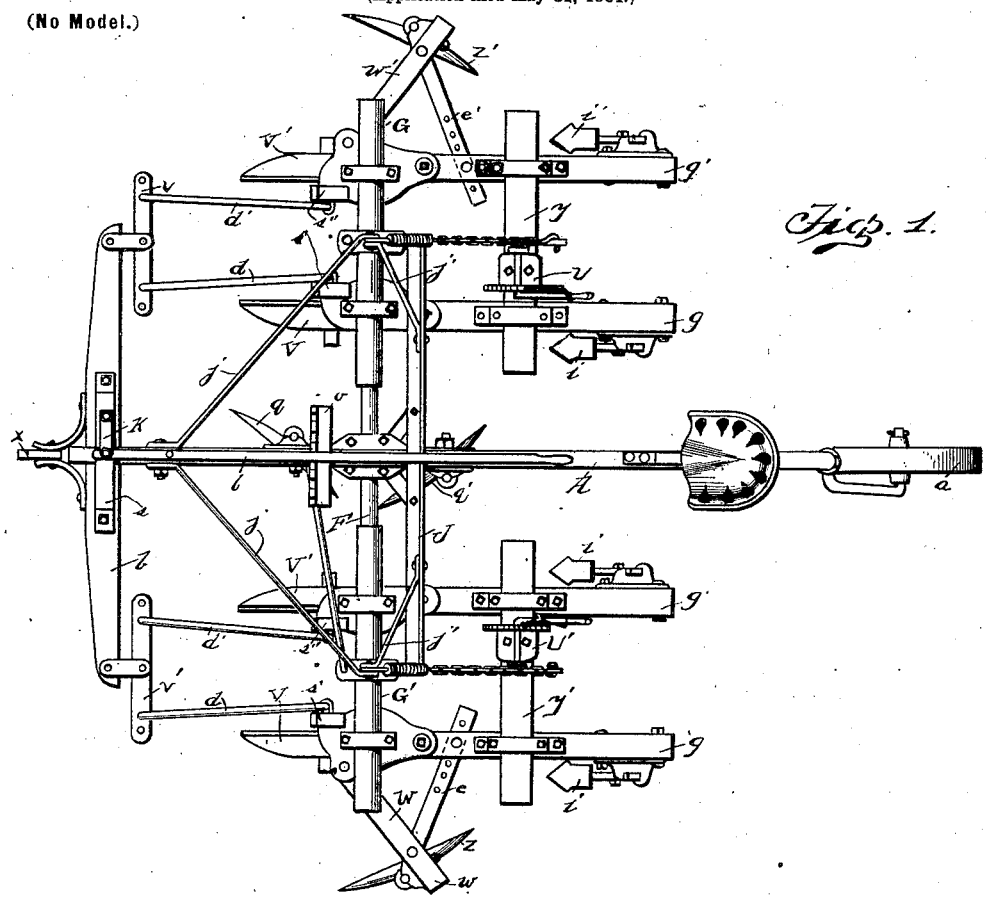
Figure 2:
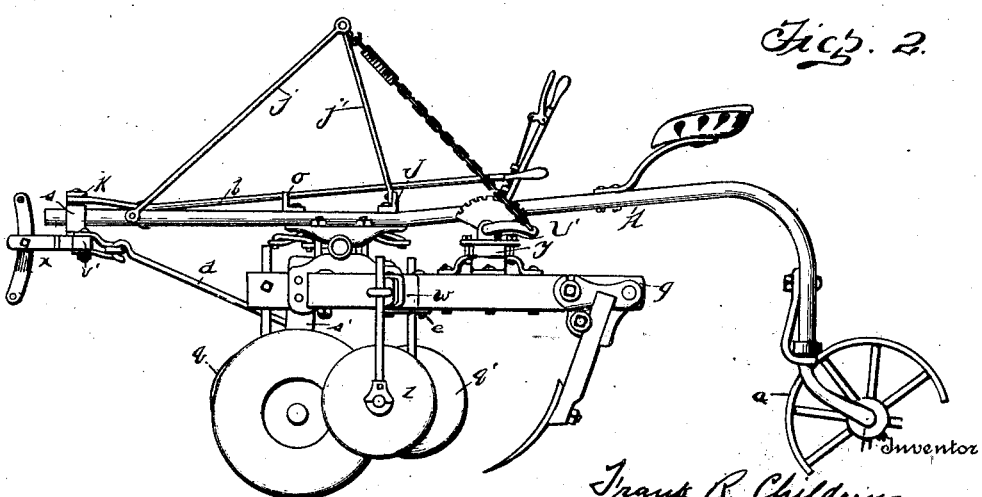

Figure 1 is a plan of the cultivator, and Fig. 2 is a side elevation of the same.

A is the center beam of the machine, to which are attached a seat, the frame J $j\ j'$, caster-wheel $a$, lever $l$ with rack $o$, the bar F, and convenient cultivating instrumentalities, (indicated herein as disks $q\ q'$, but not limited to them.) The beams $g\ g'$ support cultivating instrumentalities V V', $i$, and $i'$, &c., and are connected together by cross-bars $y\ y'$ and the hollow bars G G', which allow the distance between them to be changed, which bars slide endwise upon the bar F, which beams so connected are referred to herein as the "gangs" of the machine.

Upon the frame A a cross-bar called herein a "draft-bar" $b$ is arranged to slide horizontally in a loop $s$ upon the said center frame A. This may be accomplished by the loop $s$ or it may be suspended in any convenient manner for horizontal movement with respect to the said frame A. The draft-bar $b$ has at $x$ a convenient means for attaching a doubletree or tripletree, as may be desired. At the respective ends of the draft-bar $b$ and at such distance apart that will give the gangs the proper extent of transverse movement are hinged the eveners $v$ and $v'$, into which are engaged to move vertically and horizontally one end respectively of the draft connections $d$ and $d'$, or the draft-bar $b$ may be made to slide only lengthwise of the frame A, and the application of the hitch at $x$ and the point of application of the eveners to the draft-bar instead of being hinged may be arranged to slide or roll upon the draft-bar and said draft attachment connecting the power and the respective points of application of said eveners upon said draft-bar $b$ be connected to the said lever $l$ or any equivalent means of changing the hitch of the draft applied at the point of application of the power $x$ to the eveners $v$ and $v'$ and through the connections $d$ and $d'$ to the machines; but the connection of the suspended or sliding draft-bar is preferred. These eveners are arranged to receive said draft connections in such different positions as to admit of adjustable widths or distances horizontally between the beams of the gangs $g\ g'$ as may be desired at different stages of cultivation. The other ends of said draft connections $d\ d'$, &c., engage the beams or standards or brackets s s', &c., on the beams g g', &c., which standards or brackets, here shown carrying disks or wheels used for purpose of guiding, may also carry cultivating instrumentalities. By placing the point of application of these draft connections at a point on these standards or brackets s s' below the beams g g', &c., the whole frame and gangs may be built much higher, giving the machine much more latitude in the size of plants that may be cultivated. This means of applying the draft tends to hold the cultivating instrumentalities into the soil at the proper depth when properly set independently of the weight of the machine and operator. The draft connections d d' are so connected to the standards or brackets s s' that there may be both lateral and vertical movement. The cross draft-bar b engages the end of the lever l, which lever is pivoted to the frame A, the other end of which lever extends back to within convenient reach of the operator riding upon the seat. This lever l is attached so as to not interfere with the slight movement the draft-bar b may have upon the center frame A backward and forward, but is connected so as to move the said draft-bar laterally by a movement of the operating end of the lever horizontally. It is obvious that this might be done by making the pivot of the lever l to slide upon the frame A and by other equivalent means; but it is preferably so arranged by the connection K, hinged both to the lever and the draft-bar b. A notched rack may be fastened to the frame, as shown at o, into which the lever l may be caught and held at various positions, as the operator may desire. By the lever the operator is enabled to throw the draft-bar b to the right or left of the center frame A within certain limits, covered by the ability of said draft-bar b to move laterally relatively to the frame A, and by such shifting of the line of draft applied to the machine the operator directs the cultivator on entering the furrows at the ends of rows and at places where the ridges between the rows are washed out or irregular or where the furrows are filled up or when from any cause there are no furrows to guide the machine and to keep the machine properly over the plants. It is a common fault of cultivators of this type that upon sideling or hillside ground and uneven ground they will creep or slide downhill and the ridges of soil which mainly direct them are not sufficient guide and control for them. In this construction the operator can by the manipulation of the lever l, and thus deflecting slightly the line of draft without drawing the horses over onto the plants, cause the machine to creep or draw uphill rather than down when on sideling or uneven ground. By this draft connection and the lever L it will be seen that with the horses or means of draft pursuing the same direction between the rows the machine may slightly pursue, due to the resistance of its cultivating instrumentalities, a direction only attained otherwise by driving over the plants or very near them, which results in damage.

To the outermost beams g g', &c., of the gangs extensions w and w' are attached which carry cultivating instruments, here shown as disks z z', but only for illustration. These extensions are arranged so that the distance between the cultivating instruments thereon and those on the beam to which extensions are attached may be adjusted within reasonable limits. This may be done by other suitable means; but it is preferred to hinge the extension or wing beams w w' upon the beams g and g' and fastening the extension-pieces e and e' in such a manner as to adjust the angle of the said extensions w and w', which adjustment may be accomplished by bolting the pieces e e' at one extremity, respectively, and bolting or clamping by means of bolts or equivalents in the same manner as the pieces y y' are clamped to the beams g g' at the other extremity or fastening said extensions e e' by other equivalent means, such that by loosening said bolts, clamps, or equivalents the position of the wing-beams w and w' may be moved and then fastened again by a reversal of the operation. For convenience the said extensions e e' are here shown as supplied with a succession of holes at the end engaging the beams on both, which extensions so provided with holes to receive a bolt through the beams, respectively, may have the series of holes made into a slot, the said extensions e and e' being held in position by the pressure of bolt or equivalent. The center beam A also has means for attaching cultivating instrumentalities q q'. By this construction this machine will cultivate all of the space between the rows of plants without going over the ground more than once and admits of opening up small furrows upon the ridges between the rows of plants, all of which is accomplished by the shortest possible machine.

Upon the frame A of the machine the additional frame J j j' is fastened, to which is attached the connections of the suitable means for raising and lowering the gangs placed thereon at U and U'.

Having described the invention, what is claimed, and desired to be secured by Letters Patent, is—

1. In a cultivator, having transversely-adjustable gangs connected to move simultaneously, the combination of a wing-beam laterally adjustable having means for carrying cultivating instrumentalities with such gangs all for the purposes described.

2. The combination in a cultivator of a center frame, carrying cultivating instrumentalities, a cross-bar carrying transversely-adjustable gangs having wing-beams carrying cultivating instrumentalities adjustable laterally to the said gangs, all for the purposes set forth.

3. The combination in a cultivator having transversely-adjustable gangs connected to move simultaneously, of a center beam carrying a cross-bar engaging said gangs, a lever pivoted thereon, a draft-bar sliding or
5 suspended to said frame, eveners adjustable to receive draft connections engaging said gangs, laterally-adjustable wing-beams carrying cultivating instrumentalities, all substantially as described and for the purposes set forth.

FRANK R. CHILDREN,
*Administrator of inventor's estate.*

Witnesses:
HARRY G. MCGEE,
GEORGE G. BAIRD.